May 6, 1947.  D. BARRETT  2,420,063

PROCESS OF COOKING AND SEASONING HARD CRABS

Filed Nov. 30, 1945

Daniel Barrett, Inventor

By (signature)

Attorney

UNITED STATES PATENT OFFICE 2,420,063

PROCESS OF COOKING AND SEASONING HARD CRABS

Daniel Barrett, Appeal, Md.

Application November 30, 1945, Serial No. 631,936

4 Claims. (Cl. 99—158)

This invention is a process for steaming and seasoning hard crabs.

In processes of cooking, steaming and seasoning crabs heretofore practiced, certain objections have been met. Where the bulk of hard crabs has been superimposed over liquid, usually containing the seasoning materials, it has been found that some of the crabs, particularly those lowermost in the mass, become laden with liquid incident to condensation in the cooking or steaming process. It has frequently been found that the seasoning material in the underlying liquid has not been uniformly distributed throughout the entire mass of crabs. In instances where the crabs have been subjected to cooking temperatures in a steam box, it has been found difficult to evenly distribute the seasoning material throughout the mass of crabs, particularly where crabs are cooked in large quantities. It is the purpose of the present invention to provide means whereby crabs, either in large or small quantities may be evenly and thoroughly cooked, and at the same time evenly and uniformly seasoned without the objections heretofore mentioned.

Figure 1:
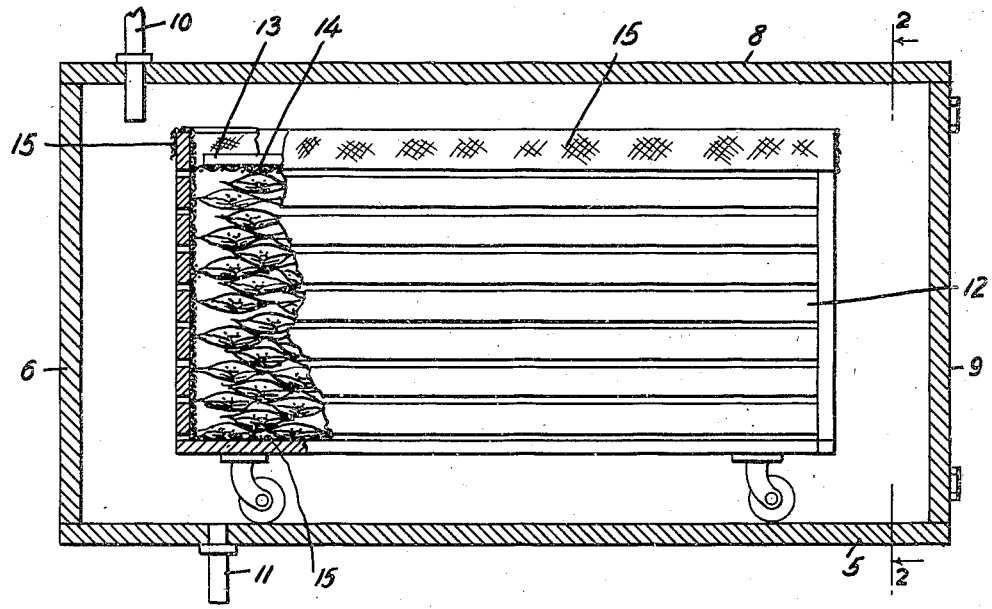
Figure 2:
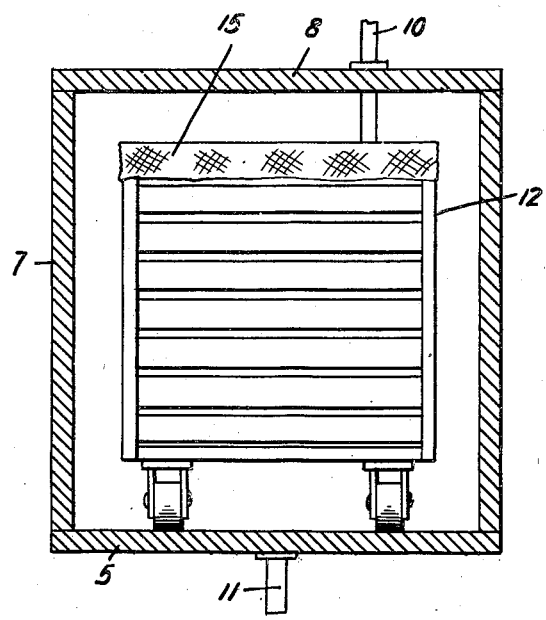

This process is carried out by means of suitable apparatus, an instance of which is shown in the accompanying drawings, wherein:

Fig. 1 is a vertical longitudinal sectional view taken through a conventional form of steam box or chest and showing therein a car or carrier laden with hard crabs to be subjected to the improved cooking and seasoning process, and Fig. 2 is a transverse sectional view taken through the chamber on line 2—2 of Fig. 1.

Referring now more particularly to the drawings, the conventional form of steam box includes the bottom 5, end 6, side walls 7, top 8 and door 9 by which access may be had to the interior of the chest. It will be understood that this chest will be of proper size for the accommodation of the receptacles or cars containing the crabs, and the joints will be properly sealed so as to prevent the escape of steam. Steam is admitted to the receptacle through the inlet 10, while a drain pipe 11 is arranged in the floor of the chest to drain off liquids from steam condensation as well as such liquids as are driven from the crabs in the course of the cooking process. The crabs are contained within a car represented generally at 12. This car has a slatted bottom, sides and ends, the spaces between the slats being such as to permit of the entry of steam to all the sides, ends and bottom of the car as well as to the top thereof. The top consists of a slatted cover indicated at 13 capable of being readily removed when desired. The car is of such size, with respect to the steam box, as to provide ample space between the bottom and top of the car and the corresponding confines of the steam chest, as well as between the sides and ends of the steam chest and the car. The car and chest here illustrated is typical of apparatus used in steaming crabs and may be varied if desired.

The process of preparing the crabs for cooking consists in first moistening the live crabs and placing them in an even layer upon the bottom of the car. This layer of crabs is then liberally sprinkled with the seasoning ingredients in dry form, these ingredients to adhere to the shells, fins and claws of the crabs. A second layer of moistened crabs is then applied to the bottom layer, whereupon the said second layer is similarly sprinkled with the seasoning materials. Additional layers of moistened hard crabs are positioned in the same manner within the car, each layer being sprinkled with the seasoning material as stated. When the entire mass of crabs has thus been placed within the car, the slatted top 13 is applied to the top layer over a coarse fabric, such as gunny sacking, indicated at 14. Similar coarse fabric indicated at 15 is applied to the sides and ends of the car, either upon the interior or the exterior thereof.

The ingredients of the seasoning mixture may vary in accordance with the flavor desired. It has been my experience that a desirable seasoning includes coarse salt, red pepper, thyme, sage, cloves, mustard, cinnamon, etc., thoroughly mixed in dry state. This material is easily handled, and will be found to readily adhere to the moistened crabs.

After the mass of crabs has been arranged in the car and sprinkled with seasoning material in the manner described, the car is moved into the steam chest and the door securely fastened. Steam is then admitted to the interior of the chest through the inlet 10 at such pressure as will maintain a temperature within the chamber ranging from 190° F. to 200° F. The application of steam of the proper pressure to produce this temperature is maintained for a period of approximately 35 minutes. As the steam enters the chamber it wholly envelopes the car, having access to all sides, bottom and top. The burlap surrounding the crab mass within the car, however, breaks the high pressure and also helps to keep the heat in the car, as well as to keep the seasoning from being driven out of the car sides. The moisture upon the crab shells, claws and fins tends to dissolve the seasoning material upon the bodies of the crabs, and this dissolution is augmented by the mixture of condensation from the steam. The seasoning essence thus produced is driven into the meaty body of the crabs because of the steam pressure. It will be understood, of course, that the pressure within the car body is less than that within the chamber because of the burlap or fabric material lining the car. However, the steam pressure within the car is sufficient to bring about the action mentioned. The pressure at first drives all moisture from the body, claws and fins of the crabs, and at the same time drives the seasoning solution or essence into the bodies, claws and fins. The moisture driven from the crabs precipitates to the floor of the steam chest and passes off through the drain 11. By the application of the coarse fabric, such as gunny sacking or burlap to the sides, ends and top of the car, the force of steam entering the car is checked, otherwise the rush of steam would drive the seasoning material from the bodies or shells of the crabs and out through the slatted sides of the car. The pressure within the car, however, is sufficient to reach entirely through the mass of crabs, with the result that at the termination of the steaming period as above outlined, it will be found that all crabs of the mass are evenly cooked and seasoned and entirely free of moisture. It will also be found that after the cooking operation, the undissolved particles of seasoning material are firmly adhered to the shells, fins and claws of all the crabs.

I claim:

1. The process of steaming hard crabs, which consists in moistening the crabs and arranging them in superimposed layers within a container, applying a dry seasoning mixture to each layer of crabs, partially covering the entire mass of crabs, and subjecting the container and its contents to steam pressure to produce a temperature of approximately 195° F. and maintaining such pressure and temperature a predetermined period.

2. The process of seasoning and cooking hard crabs, which consists in moistening the live crabs and arranging them in superimposed layers in a steam chamber, applying a mixture of dry seasoning material to the moistened crabs of each layer, protecting the mass of crabs with a porous material, and subjecting the mass to steam pressure to produce a temperature of approximately 195° F. and maintaining such pressure and temperature a predetermined period.

3. The process of seasoning and cooking hard crabs, which consists in moistening the live crabs and arranging them in superimposed layers in a steam chamber, applying a mixture of dry seasoning material to the moistened crabs of each layer, and subjecting the mass of crabs to steam pressure producing a cooking temperature of approximately 195° F. and maintaining such pressure and temperature a predetermined period.

4. The process of cooking hard crabs, which consists in arranging the crabs within a container having reticulated ends, sides, bottom and top, applying dry seasoning material to the said crabs, protecting the crabs by a porous material, disposing said container within a closed chamber, and admitting steam under pressure to said chamber ranging from 195° F. to 200° F. and maintaining such pressure and temperature a predetermined period.

DANIEL BARRETT.

REFERENCES CITED

The following references are of record in the file of this patent:

UNITED STATES PATENTS

| Number | Name | Date |
|---|---|---|
| 1,229,555 | Warner | June 12, 1917 |
| 1,252,865 | Thompson | Jan. 8, 1918 |

OTHER REFERENCES

"Practical Fish Cookery," by Webster et al., pages 9 and 10; U. S. Dept. of Commerce, Fishery Circular No. 19, Washington, D. C. 1935.

"A Complete Course in Canning," page 280, published by "The Canning Trade," Baltimore, Maryland, 1924.